United States Patent Office 3,264,260
Patented August 2, 1966

3,264,260
CATALYZED PHENYLSILOXANE RESINS
Robert W. Muller and Gust J. Kookootsedes, Midland, Mich., assignors to Dow Corning Corporation, Midland, Mich., a corporation of Michigan
No Drawing. Filed Apr. 2, 1964, Ser. No. 356,938
11 Claims. (Cl. 260—46.5)

This invention relates to improved silicone resin molding compositions which contain new catalysts.

In preparing silicone resin molding compositions, one needs to blend the resin, catalyst, and filler, if desired. Since silicone resins are generally hard and brittle at room temperature, it is necessary to heat the resin while the filler and catalyst are being mixed therewith, in order to soften the resin sufficiently to permit uniform blending.

Problems, however, arise in the field of transfer molding, for the catalyzed resin must be thermosetting, yet the resin must be fluid enough to pass through the small transfer molding channels to the molds; but notwithstanding this, the resin must thermoset shortly thereafter, in order that the molding process be rapid.

A dilemma arises with standard curing catalysts for thermosetting resins: if the mold temperature is high enough to cause rapid setting in the molds, the resin is likely to set in the transfer molding channels before the molds are filled; yet if the mold temperature is low enough for the molds to be consistently filled with resin, the setting time is inefficiently long.

A main object of this invention is to create new curing catalysts for silicone resins which permit unhindered transfer of the fluid resin through the transfer molding channels, yet which also yield a rapid set time for the resin. Other compositions of this invention make excellent fast catalysts for compression molding.

The thermosetting resin compositions of this invention comprise an intimate mixture of (a) an uncured phenylsiloxane resin containing at least 0.25 percent by weight of silicon-bonded hydroxyl groups, and a catalytic amount of (b) a composition consisting of from 45 to 70 mol percent of a hydroxylated compound selected from the group consisting of aliphatic and cycloaliphatic alcohols, hydroxylated aromatic compounds, and aliphatic, cycloaliphatic, and aromatic polyols where, in any aromatic polyol, at least two carbonyl groups are separated by at least one carbon atom, such hydroxylated compound being in a nonsolid phase at the thermosetting temperature, and from 30 to 55 mol percent of a compound selected from the group consisting of lead carbonate and the oxides of lead.

It is preferred for ingredient (b) to contain from 50 to 70 mol percent of hydroxylated compound and from 30 to 50 mol percent of the lead compound.

The mechanism by which this new catalyst works is uncertain. It is often desirable, however, to mix ingredient (b) so that there are 2 mols of hydroxyl groups per mol of lead, which indicates that the hydroxylated compound may be forming a complex with the lead compound.

Any aliphatic or cycloaliphatic alcohol is suitable for the purposes of this invention. It is preferred, however, to use higher boiling alcohols since the lower alcohols will be subject to rapid evaporation at thermosetting temperatures, and loss of the alcohol will lessen the thermosetting capability of the resin. Conversely, an alcohol of too large a molecular weight may be undesirable, due to the large quantities required to obtain catalysis, because of the low weight percent of hydroxyl groups. It is, therefore, preferred to use alcohols having from 4 to 30 carbon atoms.

Examples of suitable alcohols are butanol, hexanol, cyclohexanol, 2-ethylhexanol, decanol, 4-butyldecanol-7, octadecanol and myricyl alcohol. Halogenated and nitrated alcohols such as dichlorooctanol, nitropentanol, perfluoropentanol, and bromooctadecanol are also deemed to be within the scope of the term "alcohol" and operative in this invention.

Any hydroxylated aromatic compound such as phenol, chlorophenol, nitrophenol, hydroxynaphthalene, or p-cresol is also useful in the compositions of this invention. Other substituents such as halogens can be present, but any other substituent present than the hydroxyl group obviously must not react with the hydroxyl groups, or otherwise interfere with the catalytic activity of ingredient (b).

Any aliphatic, cycloaliphatic, or aromatic polyol where, in any aromatic polyol, at least two carbonyl groups are separated by at least one carbon atom is suitable for use in this invention. These polyols can also include substituted polyols such as halogenated and nitrated species.

Examples of suitable aliphatic polyols are ethylene glycol, 3,5-octenediol-1, 1,2-propanediol, 1,18-octadecanediol, glycerine, 2,4,6-decanetriol, pentaerythritol, trimethylolmethane, 1,2-difluorodecanediol-7,8, and 3-nitro-1,2-propanediol.

Examples of suitable cycloaliphatic and aromatic polyols are 1,3-cyclopentanediol, 1-methylol-2-cyclohexanol, 1,3-cyclohexenediol-5, resorcinol, chlororesorcinol, nitroresorcinol, hydroquinone, phloroglucinol, 1,5-biphenyldiol, 1,6,8-naphthylene triol, and m-dimethylolbenzene.

The choice of which hydroxylated material to use in ingredient (b) depends in part on the temperature at which the thermosetting reaction is to take place. The hydroxylated material selected for ingredient (b) must melt or sublime at a temperature at or below the temperature at which the thermosetting takes place.

The phenylsiloxane resins that can be used in the composition of this invention are well-known materials. By the term "phenylsiloxane resin" it is meant copolymers containing at least one type of said units containing a phenyl group the ratio of said phenyl and other hydrocarbon groups to silicon atoms, and the hydroxyl content of the resin, being as defined below. Examples of siloxane units that can be present in the phenylsiloxane resins are $C_6H_5SiO_{3/2}$, $(C_6H_5)_2SiO$, $CH_3SiO_{3/2}$, $(CH_3)_2SiO$, $(CH_3)C_6H_5SiO$, $C_2H_5SiO_{3/2}$, $(C_2H_5)_2SiO$
$(C_2H_5)C_6H_5SiO$, $C_3H_7SiO_{3/2}$, $(C_3H_7)_2SiO$
$(C_3H_7)C_6H_5SiO$, $CH_2=CHSiO_{3/2}$, $(CH_2=CH)CH_3SiO$
$CH_2=CHCH_2SiO_{3/2}$, $(CF_3CH_2CH_2)CH_3SiO$
$ClCH_2CH_2SiO_{3/2}$, $C_6H_{11}SiO_{3/2}$, $Cl_2C_6H_3SiO_{3/2}$
$CF_3C_6H_4SiO_{3/2}$, $(C_6H_5)CF_3CH_2CH_2SiO$ $CH_3C_6H_4SiO_{3/2}$ and $C_6H_5CH_2SiO_{3/2}$. As can be seen from the foregoing examples, any monovalent hydrocarbon or halogenated hydrocarbon group can be present in the resins along with the phenyl group. The phenylsiloxane resins employed in this invention must have a phenyl to silicon ratio in the range of .3:1 to .9:1. The ratio of the other monovalent hydrocarbon or halogenated hydrocarbon groups present to silicon must be in the range of .4:1 to 1.2:1. The total ratio of the phenyl and other substituents to the silicon must be in the range of 1:1 to 1.7:1. Preferably, the resin has a phenyl to silicon ratio of .5:1 to .7:1, an other-substituents to silicon ratio of .5:1 to 1:1, and a total phenyl and other-substituents ratio of 1.1:1 to 1.6:1. The preferred resins of this invention are phenylmethyl-siloxane resins, that is, resins containing siloxane units containing phenyl and/or methyl groups. In addition, the resins must contain at least 0.25 percent by weight of silicon-bonded OH groups. The resin can contain up to several percent, say, for example, about 6 weight percent OH groups but the minimum amount of OH groups present is critical. In addition to the OH groups the resins can contain alkoxy groups, such as the methoxy, ethoxy and isopropoxy groups, but the presence of such groups is not essential to the invention as is the presence of the OH groups.

If desired, fillers can be added to the uncured resin to increase the strength of the cured resin, reduce crazing, etc.

The particular filler or fillers employed in the composition of this invention is not critical but alkaline fillers in large quantities should be avoided as they tend to have catalytic effect in themselves toward the resins of this invention. Numerous fillers that can be used will be immediately obvious to those skilled in the art. A few of the numerous suitable fillers one might mention are glass, diatomaceous earth, crushed quartz, clays, fume silica, precipitated silica, zirconium silicate, magnesium silicate, lithium silicate, aluminum silicate, etc. Small amounts of iron oxide, magnesium oxide, titanium dioxide and calcium carbonate can also be used.

The relative amounts of the resin and filler in the composition of this invention are not critical. For example, the amount of filler can be a small fraction of the amount of resin present or the amount of filler can be several times the amount of the resin present. The relative amounts of resin and filler to be employed is dependent on the use to be made of the composition or the properties desired in an article made from the composition, and by varying the relative proportions of these two ingredients one can obtain a wide variety of properties. This, of course, is obvious to those skilled in the art.

The optimum proportion of ingredient (b) to (a) varies from system to system but generally the compositions of this invention function well when the proportion of (b) is from 0.5 to 8 weight percent of (a).

The order in which the ingredients of the catalyst combination are added to the resin is not critical. Either can be added first or they can be added simultaneously. Also, if so desired, the catalyst ingredients can be mixed with a small amount of filler prior to being added to the bulk of the resin-filler mixture.

In addition to the above ingredients, small amounts of conventional additives can be included in the composition. For example, release agents such as calcium or aluminum stearate, pigments such as iron oxides or carbon black, preservatives, etc. can also be employed in the composition.

The following examples are illustrative only and should not be construed as limiting the invention which is properly delineated in the appended claims.

Example 1

A composition containing the following ingredients was formulated: 200 grams of an uncured resin of the approximate formula $[(C_6H_5)_{0.60}(CH_3)_{0.725}SiO_{1.337}]_x$ where $x$ is greater than 1, there being more than 0.25 weight percent, based on the weight of the resin, of silicon-bonded hydroxyl groups present; 320 grams of Owens Corning ¼″ hammer milled fibreglass; 268 grams of Glascast 58 fused and ball-milled silica; 4 grams of aluminum stearate as a release agent; 18 grams of Ferro Corporation 2302 Black pigment; 1.8 grams of lead carbonate; and 1 gram of resorcinol.

The lead carbonate and resorcinol were first mixed with part of the silica, while the other ingredients were milled on a 2 roll mill at a temperature between 120 and 170° F. for 7 minutes. The catalyst mixture was then added, and the composition was milled for 3 more minutes.

The composition was tested for flow and moldability on a Hull press. The molding temperature was 350° F., and the length of flow before cure through a ⅛ inch channel at 500 p.s.i. was 24 inches.

The molded composition was removed from the channel after three minutes at the molding temperature, and was found to be unblistered, indicating a good cure. The composition, therefore, appeared to be suitable for transfer molding.

Example 2

A composition containing the following ingredients was formulated: 200 grams of an uncured resin of the approximate formula $[(C_6H_5)_{0.65}(CH_3)_{0.50}SiO_{1.42}]_x$, where $x$ is greater than 1, there being more than 0.25 weight percent, based on the weight of the resin, of silicon-bonded hydroxyl groups present; 598 grams of Glascast 58 fused and ball-milled silica; 2 grams of calcium stearate as a release agent; 1.8 grams of lead carbonate; and 1.1 grams of hydroquinone.

The lead carbonate and hydroquinone were first mixed with part of the silica, while the other ingredients were milled on a 2 roll mill at a temperature between 160 and 180° F. for 5 minutes. The catalyst mixture was then added, and the composition was milled for 3 more minutes.

The composition was tested in the manner of Example 1. The flow was 20 inches at 510 p.s.i., indicating suitability for transfer molding.

Example 3

A composition containing 200 grams of the uncured resin of Example 1, 400 grams of Owens Corning ¼ inch hammer-milled fibreglass, 190 grams of Glascast 58 fused and ball-milled silica, 8 grams of Drackenfeld black pigment No. 10035, 2 grams of aluminum stearate as a release agent, 2 grams of lead carbonate, and 0.56 grams of propylene glycol was formulated in the manner of Example 1, using a 2 roll mill at a temperature of 110° F. The first milling was for six minutes, and the second milling lasted three minutes.

The composition was tested in the manner of Example 1. The flow was 20½ inches at 510 p.s.i. The molded channel was blister-free after three minutes, indicating suitability for transfer molding.

The above composition was found to give a longer resin flow than an identical composition where an equimolar amount of ammonium stearate was substituted for the propylene glycol ingredient.

Example 4

The experiment of Example 3 was repeated, except that the propylene glycol ingredient was replaced with 4.55 grams of octadecanol-1.

The flow was 27½ inches at 510 p.s.i. After 3 minutes the composition was cured, indicating suitability for transfer molding.

Example 5

When an uncured phenylsiloxane resin of the approximate formula

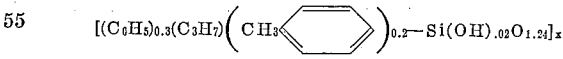

where $x$ is greater than 1, is mixed with 50 weight percent of magnesium silicate and 0.5 weight percent of a mixture of 30 mol percent of $PbO_2$ and 70 mol percent of cyclohexanol, both based on the weight of the resin, a thermosetting composition is formed.

Example 6

When an uncured phenylsiloxane resin of the approximate formula $[(C_6H_5)_{0.9}(CF_3CH_2CH_2)_{0.2}(CH_3)_{0.2}-Si(OH)_{.1}O_{1.3}]_x$ where $x$ is greater than 1, is mixed with 8 weight percent, based on the weight of the resin, of a mixture of 55 mol percent of PbO and 45 mol percent of glycerine, a thermosetting composition is formed.

Example 7

Three portions of the composition of Example 3 were prepared, except that the propylene glycol ingredient was replaced by 1.1 grams of primary butanol in sample 1, 1.1 grams of secondary butanol in sample 2, and 1.1 grams of tertiary butanol in sample 3.

The compositions were tested in the manner of Example 1. The flow of sample 1 was 22 inches at 510 p.s.i.; the flow of sample 2 was 28 inches at 510 p.s.i.; and the flow of sample 3 was 24 inches at 510 p.s.i.

That which is claimed is:

1. A thermosetting transfer molding resin composition comprising an intimate mixture of
   (a) an uncured phenylsiloxane resin containing at least 0.25 percent by weight silicon-bonded hydroxyl groups and a catalytic amount of
   (b) a composition consisting of from 45 to 70 mol percent of a hydroxylated compound selected from the group consisting of aliphatic alcohols, cycloaliphatic alcohols, and hydroxylated aromatic compounds, where, in any hydroxylated aromatic compound, any two $\equiv$COH groups present in the same molecule are separated by at least one carbon atom, said hydroxylated compound being in a nonsolid phase at the thermosetting temperature, and from 30 to 55 mol percent of a compound selected from the group consisting of lead carbonate and the oxides of lead.

2. The composition of claim 1 where (b) contains lead carbonate.

3. The composition of claim 1 where (b) is a mixture of lead carbonate and resorcinol.

4. The composition of claim 1 where (b) is a mixture of lead carbonate and octadecanol.

5. The composition of claim 1 where (b) is a mixture of lead carbonate and propylene glycol.

6. The composition of claim 1 where (b) is a mixture of lead carbonate and hydroquinone.

7. The composition of claim 1 where (b) contains PbO.

8. The composition of claim 1 where (b) contains $PbO_2$.

9. The process of transfer molding the composition of claim 1.

10. The cured composition of claim 1.

11. The composition of claim 1, mixed with a filler.

References Cited by the Examiner
UNITED STATES PATENTS

| | | | |
|---|---|---|---|
| 2,467,853 | 4/1949 | Poskitt et al. | 260—46.5 |
| 2,484,595 | 10/1949 | Sprung | 260—46.5 |
| 2,516,047 | 7/1950 | De Coste | 260—46.5 |
| 2,579,332 | 12/1951 | Nelson | 260—45.95 |
| 2,666,041 | 1/1954 | Pfeifer | 260—46.5 |
| 2,684,957 | 7/1954 | Konkle | 260—46.5 |
| 2,723,966 | 11/1955 | Youngs | 260—46.5 |
| 2,810,705 | 10/1957 | Lewis | 260—46.5 |
| 2,973,335 | 2/1961 | Stasiunas | 260—45.95 |

LEON J. BERCOVITZ, *Primary Examiner.*

DONALD E. CZAJA, *Examiner.*

F. McKELVEY, *Assistant Examiner.*